(12) United States Patent
Qin

(10) Patent No.: US 6,865,172 B1
(45) Date of Patent: Mar. 8, 2005

(54) RECEIVING METHOD AND RECEIVER

(75) Inventor: Zhengdi Qin, Oulu (FI)

(73) Assignee: Nokia Corporation, Espoo (FI)

(*) Notice: Subject to any disclaimer, the term of this patent is extended or adjusted under 35 U.S.C. 154(b) by 0 days.

(21) Appl. No.: 09/230,504

(22) PCT Filed: Sep. 12, 1997

(86) PCT No.: PCT/FI97/00544

§ 371 (c)(1),
(2), (4) Date: Jan. 26, 1999

(87) PCT Pub. No.: WO98/11675

PCT Pub. Date: Mar. 19, 1998

(30) Foreign Application Priority Data

Sep. 13, 1996 (FI) .................................................. 963640

(51) Int. Cl.[7] .............................................. H04J 13/02
(52) U.S. Cl. ...................................... 370/342; 370/335
(58) Field of Search ................................ 370/203, 342, 370/335, 519, 210, 320, 441; 375/130, 145, 150, 152

(56) References Cited

U.S. PATENT DOCUMENTS

| 4,984,247 | A | | 1/1991 | Kaufmann et al. | |
|---|---|---|---|---|---|
| 5,629,929 | A | | 5/1997 | Blanchard et al. | |
| 5,796,775 | A | * | 8/1998 | Aoyama | ..................... 375/208 |
| 6,205,166 | B1 | * | 3/2001 | Maruta et al. | ............... 375/130 |

FOREIGN PATENT DOCUMENTS

| FI | 97505 | 5/1996 |
|---|---|---|
| WO | WO 95/24086 | 9/1995 |
| WO | WO 96/17446 | 6/1996 |

OTHER PUBLICATIONS

"On Multi-Carrier Code Division Multiple Access (MC-CDMA) Modem Design", IEEE 44th Vehicular Technology Conference, vol. 3, pp. 1670–1674, Jun. 1994.
"Acquisition Performance of a DS/CDMA System in a Mobile Satellite Environment", IEICE TRANS. COMMUN. vol. E80-B, No. 1, pp. 40–48, Jan. 1997.
Copy of International Search Report for PCT/FI97/00544.

* cited by examiner

*Primary Examiner*—Douglas Olms
*Assistant Examiner*—Ken Vanderpuye
(74) *Attorney, Agent, or Firm*—Squire, Sanders & Dempsey L.L.P.

(57) ABSTRACT

The invention relates to a receiving method and a receiver to be used in a cellular radio system. The received signal is FFT transformed and the spreading code of the receiver is FFT transformed in transform means (30). A transformed signal (36) and spreading code (37) are multiplied to provide a product (38) whose phase is shifted by the propagation delay of the signal in shift means (33). After this, a shifted product (39) is IFFT transformed in inverse transform means (34) at the same time as the components of the transmitted signals that have propagated on different paths are combined, whereby the information of the signal can be detected.

10 Claims, 1 Drawing Sheet

RECEIVING METHOD AND RECEIVER

FIELD OF INVENTION

The invention relates to a receiving method used in a radio system comprising at least one base station and subscriber terminal equipment which base station and subscriber terminal equipment multiply a signal by a spreading code and look for one or more propagation delays of the received signal when the signal has propagated on one or more paths.

The invention further relates to a receiver used in a radio system comprising at least one base station and subscriber terminal equipment which base station and subscriber terminal equipment are arranged to multiply a signal by a spreading code and look for one or more propagation delays of the received signal when the signal has propagated on one or more paths.

BACKGROUND OF INVENTION

In the CDMA, a user's narrowband data signal is modulated by a spreading code with a broader band than a data signal to a relatively broad band which can be from 1 to 50 MHz, for example. A spreading code is generally formed of a long pseudo-random bit sequence. The bit rate of the spreading code is considerably higher than that of the data signal, and in distinction from data bits and data symbols, bits of a spreading code are called chips. Each data symbol of a user is multiplied by all the chips of the spreading code. In that case a narrowband data signal will be spread to the frequency band used by the spreading code. Each user has a specific spreading code. Several users send their signals simultaneously on the same frequency band and data signals are separated from one another in receivers on the basis of a pseudo-random spreading code.

A receiver is synchronized initially with a signal to be received by means of a pilot signal sent by the base station, and after this, the correlators in the receiver are synchronized with the desired signal which they identify on the basis of the spreading code. The correlators restore the data signal to its original narrow band. The signals received at the receiver, modulated by another spreading code, do not correlate in the ideal case in the receiver, but they retain their broad band. The spreading codes selected by the system are selected so that they correlate as little as possible with respect to one another, that is, they are orthogonal.

It is typical of the radio system environment that a signal passing between a user and a base station does not travel directly, but depending on the characteristics of the environment, propagates on various paths of different lengths from the transmitter to the receiver. The multipath propagation takes place although there was a direct line of sight between the base station and the mobile station. The multipath propagation is originated by the signal being reflected and scattered in the interfaces it encounters. Signals passing on different paths have a propagation delay of a different length and thus they arrive at the receiver in different phases.

A so-called RAKE receiver comprising one or more RAKE branches is generally used in the CDMA receiver solution. Each branch is an independent receiver unit whose function is to assemble and demodulate one received signal component. Each RAKE branch can be instructed to synchronize with a signal component propagated on a different path and in a conventional CDMA receiver, the signals of the receiver branches are preferably combined to provide a signal of good quality.

In the spread spectrum system, the ordinary way of receiving a multipath propagated signal from a fading channel is arranged by using several receivers for different paths and by combining at the end the results of various receivers. Several overlapping structures and coordination means for them are then needed, which makes the receiver complex. The number of utilizable paths is also limited to the number of receiver units, in which case the energy of a multipath propagated signal will be lost.

CHARACTERISTICS OF INVENTION

The object of the present invention is to accomplish a receiving method which simplifies the receiver and which can utilize a number of multipath propagated signal paths not limited in advance.

This is attained by a method as disclosed in the preamble which is characterized by convolution transforming the received signal; convolution transforming the spreading code of the receiver; multiplying the transformed signal and spreading code to provide a product; shifting the phase of the product by an amount dependent on the propagation delay in a known manner; and inverse convolution transforming the phase-shifted product and combining the components of the transmitted signal that have propagated on different paths, whereby the information of the signal can be detected.

The receiver of the invention is characterized in that the receiver comprises transform means for convolution transforming the received signal and spreading code; multiplication means for multiplying the transformed signal and spreading code to provide a product; shift means for shifting the phase of the product by an amount dependent on the propagation delay in a known manner; and inverse transform means for inverse convolution transforming the phase-shifted product and for combining the signal that was transmitted on different paths, whereby the information of the signal can be detected.

Considerable advantages are attained with the method of the invention. Only one receiver unit is needed for the multipath propagated signal. Phase acquisition is simple. Information is not needed about the number and characteristics of paths, which improves the quality of reception especially in a time-varying environment. The more paths, the better the reception will be because all the signal components of the multipath signal paths strengthen detection.

BRIEF DESCRIPTION OF FIGURES

In the following, the invention will be explained in more detail with reference to the examples of the appended drawings, in which.

DESCRIPTION OF PREFERRED EMBODIMENTS

Figure 1:
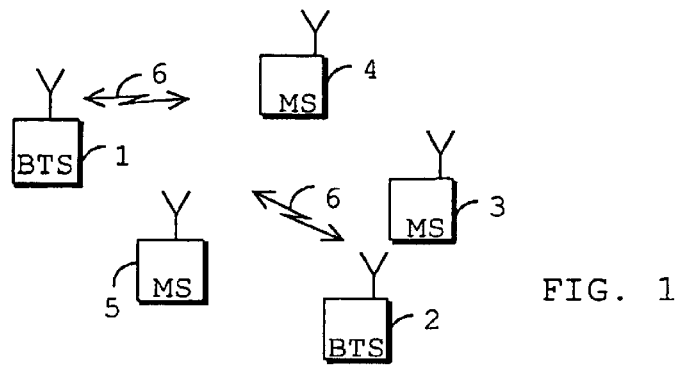
FIG. 1 shows a radio system.

The solution of the invention is suitable to be used particularly in a CDMA (Code Division Multiple Access) system operating on the DS (Direct Sequence) principle, without being restricted thereto.

The method of the invention is now examined in more detail. In a typical prior art solution, the reception of a radio system operates in the time domain. In the preferred embodiment of the invention, both the received signal and the specific spreading code of the receiver are transformed by a convolution transform into the transform domain and the processing of the signal takes place in this transform domain. After processing, the product is inverse transformed. The solution of the invention can be realized by any transform that transforms the convolution product into an ordinary product as in multiplication. Suitable transforms are Fourier, Laplace and Z transforms, for example, whose general mathematical presentations and presentations of inverse transforms are as follows:

$$\mathcal{F}\{f(t)\} = F(\omega) = \frac{1}{\sqrt{2\pi}} \int_{-\infty}^{\infty} f(t) e^{-i\omega t} dt, \qquad (1)$$

$$\mathcal{F}^{-1}\{F(\omega)\} = f(t) = \frac{1}{\sqrt{2\pi}} \int_{-\infty}^{\infty} F(\omega) e^{i\omega t} d\omega, \qquad (2)$$

$$\mathcal{L}\{f(t)\} = F(s) = \int_{0}^{\infty} e^{-st} f(t) dt, \qquad (3)$$

$$\mathcal{L}^{-1}\{F(s)\} = f(t) = \int_{0}^{\infty} e^{st} F(s) ds, \qquad (4)$$

$$Z\{f(n)\} = F(z) = \sum_{n=0}^{\infty} f(n) z^{-n}, \qquad (5)$$

$$Z^{-1}\{F(z)\} = f(n) = \frac{1}{2\pi i} \oint_C F(z) z^{n-1} dz, \qquad (6)$$

where F refers to a Fourier transform, $F^{-1}$ to an inverse Fourier transform, L refers to a Laplace transform and $L^{-1}$ to an inverse Laplace transform, Z refers to a Z transform and $Z^{-1}$ refers to an inverse Z transform, $F(\omega)$ is a Fourier transform of $f(t)$, $F(s)$ is a Laplace transform of $f(t)$ and $F(z)$ is a Z transform of $f(n)$, i is an imaginary unit to which i= $\sqrt{-1}$ holds true, t is a time variable, n is a sample variable, $\omega$ is a variable of the frequency domain of Fourier transform, s is an s variable of the imaginary s domain of Laplace transform and z is a z variable of Z transform. Fourier and Laplace transforms are intended especially for continuing functions $f(t)$, but they can also be used for discrete time sample functions $f(n)$, such digital signals based on sampling in the Sd radio system, for example. A Z transform is, in turn, intended to transform discrete time sample functions. The transforms mentioned above are so-called convolution transforms to which the convolution $f(t)*g(t)$ of the functions $f(t)$ and $g(t)$ operates in the following way:

$$\mathcal{F}\{f(t)*g(t)\} = \frac{1}{\sqrt{2\pi}} \int_{-\infty}^{\infty} \int_{-\infty}^{\infty} f(p) g(t-p) e^{-i\omega t} dp\, dt$$

$$= \frac{1}{\sqrt{2\pi}} \int_{-\infty}^{\infty} \int_{-\infty}^{\infty} f(p) g(t-p) e^{-i\omega t} dt\, dp,$$

wherein transforming t=p+q yields $$\mathcal{F}\{f(t)*g(t)\} = \frac{1}{\sqrt{2\pi}} \int_{-\infty}^{\infty} \int_{-\infty}^{\infty} f(p) g(q) e^{-i\omega(q+p)} dq\, dp,$$

which is $$\mathcal{F}\{f(t)*g(t)\} = \frac{1}{\sqrt{2\pi}} \int_{-\infty}^{\infty} f(p) e^{-i\omega p} dp \int_{-\infty}^{\infty} g(q) e^{-i\omega q} dq,$$

which further is $$F\{f(t)*g(t)\} = \sqrt{2\pi} F\{f(t)\} F\{g(t)\} = \sqrt{2\pi} F(\omega) G(\omega).$$

Thus it can be seen that a convolution between two functions is transformed in a Fourier transform into an ordinary product $F(\omega)G(\omega)$ of the transformed functions, which product is multiplied in a Fourier transform by a constant $\sqrt{2\pi}$. This feature can be indicated for other convolution transforms in a similar way, which is evident to those skilled in the art.

Upon multiplication of the convolution transformed received signal and specific spreading code of the receiver, which code is a local code, the convolution between them is obtained, which convolution also corresponds to the correlation of the received signal. In the correlation, which this product resembles, the paths of the received signal are distinguished as (local) maximum points in the time periods of the propagation delay of the transmitter and the receiver. When the propagation delay $\tau_0$ of one path is known, the product of the transformed received signal and the local code is phase shifted preferably by the propagation delay $\tau_0$ in such a manner that in the frequency domain of the Fourier transform, for example, the frequency of the product in step $\tau_0$ will be zero, that is, the step $\tau_0$ of propagation delay is shifted into the DC level. The shift of the product into the DC level is not necessary but a shift to any known frequency is also possible. After this, the phase-shifted product is inverse transformed, in which case the bit information or bit combination information of the received signal can be detected. As a formula this can be shown as follows:

$$x(t - \tau_0) = \int_T X(f) A_0 e^{-i2\pi f(t-\tau_0)} df, \text{ which yields}$$

$$x(t-\tau_0) = F^{-1}\{X(f) A_0 e^{-i2\pi f(t-\tau_0)}\}$$

where f is the frequency so that $\omega=2\pi f$, $X(f)$ is the convolution transform of the received signal and represents the spectrum of the signal, $A_0$ is the amplitude peak of the path, that is, the maximum propagation delay $\tau_0$.

When a multipath signal is received, signal components received from various paths are preferably combined. In that case the position of several correlation maximums at propagation delays $\tau_0, \tau_1, \ldots \tau_n$ are defined and the signals are summed by weighting them by signal amplitudes $A_0, A_1, A_2, \ldots A_n$. $A_i$ is thus preferably the weighted value by which the signal of this path has an effect on the final result in the detection. The combination can be shown mathematically as follows:

$$y = \sum_{i=1}^{M} A_i x(t - \tau_i)$$

$$= \sum_{i=1}^{M} \mathcal{F}^{-1}\{X(f) A_i e^{-i2\pi f \tau_i}\}$$

$$= \mathcal{F}^{-1}\{X(f) R(f)\},$$

where M is the number of paths. Function $R(f)$ is thus the sum of impulse responses at propagation delays $\tau_0, \tau_1, \ldots \tau_n$, that is, $$R(f) = \sum_{i=1}^{M} A_i e^{-j2\pi f \tau_i}.$$

In the inventive solution, the impulse response can be integrated over several symbols, such as 1 to 10 to provide a more accurate impulse response estimate.

If the time slot $\tau_0, \tau_1, \ldots \tau_n$ is digitized uniformly, the phase shift is actually a partial convolution transform of a digital impulse response, that is, a Fourier transform, for example, during which time the signal components of all paths are preferably taken into consideration. In this way there is no need for exact information about the number and characteristics of paths. All the signal components between time slot $\tau_0, \tau_1, \ldots \tau_n$, as well as noise, have an effect on the result of the inventive solution. The path with the highest weighted value $A_i$ has the most effect.

The effect of noise can be cut off by restricting the function R(f) by a suitable threshold value in the following way:

$$A_i'(t) = \begin{cases} A_i(t), \text{ when } |A_i(t)| \geq \text{threshold} \\ 0, \text{ otherwise} \end{cases}$$

As in signal processing the frequency or the like is shifted to the DC level, that is to place f=0, there is no real reason for making an inverse convolution transform. Instead of an inverse transform, it is sufficient that signal components of different paths are summed up by a simple integrator, for example. This same integrator thus sums up the signal components of different paths and carries out the required inverse transform preferably at the same time.

Fourier transform is advantageously carried out by an FFT (Fast Fourier Transform). Inverse transform is then naturally carried out by an IFFT transform (Inverse Fast Fourier Transform). The symbol period can be preferably selected as the same as the FFT window, which is not, however, essential for the invention.

The delays $\tau_0, \tau_1, \ldots \tau_n$ of the paths can be preferably defined from the product of the transformed received signal and the local code as this product corresponds to the correlation and the maximum points of correlations represent delays of paths. The delays and the correlation can also be defined by other known methods.

FIG. 1 shows a typical CDMA radio system. The radio system comprises cells, each of which has one base station 1 and 2 and typically a set of subscriber terminal equipments 3 to 5 which are preferably mobile phones. Both the base station 1 and 2 and the subscriber terminal equipment 3 to 5 comprise at least one transceiver with which the subscriber terminal equipments 3 to 5 and the base station 1 and 2 send spread-coded signals to one another.

Figure 2:
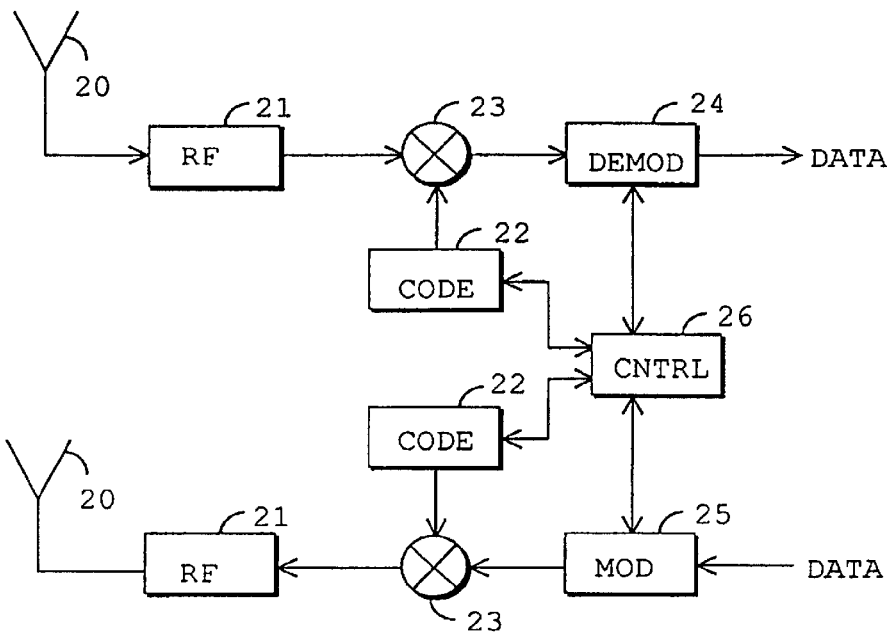
FIG. 2 shows a block diagram of a transceiver.

FIG. 2 shows a block diagram of a typical transceiver. The transceiver comprises an antenna 20, radio frequency means 21, a multiplier 23, code means 22, a demodulator 24, a modulator 25 and control means 26. The digital data to be sent in the transmitter is modulated in a modulator 25 where the data can be convolution-coded, mixed and encryption can be added. The signal sent after the modulator 25 is multiplied into a broadband signal in a multiplier 23 by a spreading code which is received from the code means 22. The broadband signal is transformed after this into a radio-frequency signal in the radio frequency means 21 in which the broadband digital signal is typically multiplied by a high-frequency analog signal of the local oscillator and high-pass filtered. The radio-frequency signal obtained in this way is sent by the antenna 20.

In the receiver part the antenna 20 receives a signal that propagates to the radio frequency means 21 where the signal is typically multiplied by a high-frequency analog signal of the local oscillator and low-pass filtered. The remaining broadband signal is multiplied in the multiplier 23 by the receiver's specific spreading code which is received from the code means 22. The output of the multiplier 23 thus has a narrowband signal containing digital information, which signal is demodulated in the demodulator 24 by de-convolution coding, by de-mixing and de-interleaving, for example. The operation of the transceiver is typically controlled by the control means 26.

Figure 3:
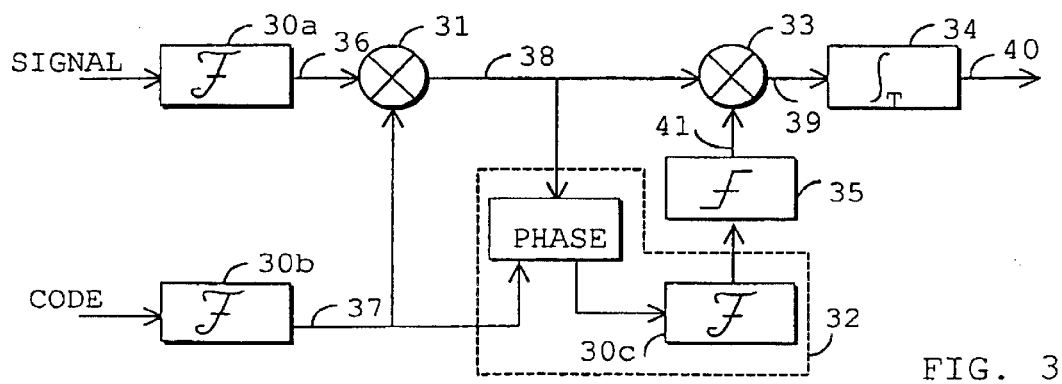
FIG. 3 shows a receiver.

Let us now examine in more detail the receiver construction of the invention shown in its essential parts in block diagram 3. The demodulator 24 of FIG. 2 preferably comprises the means shown in the block diagram of FIG. 3. The receiver comprises transform means 30, multiplication means 31, phase means 32, shift means 33, inverse transform means 34 and a limiter 35. The receiver operates according to the inventive method. The transform means 30a convolution transform the received signal and the transform means 30b convolution transform the local code into signals 36 and 37, respectively, which are multiplied in the multiplication means 31. A product 38 corresponding to the correlation of the received signal and the local code is produced as a result of multiplication. The phase means 32 form the delays $\tau_0, \tau_1, \ldots \tau_n$ of the paths of the multipath signal and make a convolution transform of the impulse response. By the shift means 33 the product is phase-shifted at each delay $\tau_0, \tau_1, \ldots \tau_n$ preferably in the frequency domain into 0 frequency, that is, into DC. The output signal 39 of the shift means 33 is summed for all the required delays and the sum signal is inverse transformed by inverse transform means 34 from which the signal 40 further propagates to other processes which are irrelevant to the invention. The shift means 33 are preferably a multiplier where a convolution transformed impulse response 41 from the phase means, corresponding to each delay $\tau_0, \tau_1, \ldots \tau_n$, and the product 38 are multiplied. To reduce noise, the convolution transformed impulse response 41 in transform means 30c is preferably cut off by the limiter 35, in which case only the maximum points exceeding a pre-determined threshold will remain of the impulse response.

The solutions of the invention can be implemented especially for digital signal processing by ASIC or VLSI circuits, for example. The functions to be carried out are preferably implemented as programs based on the microprocessor technique.

Although the invention is above explained with reference to the example of the appended drawings, it is evident that the invention is not restricted thereto, but it can be modified in many ways within the scope of the inventive idea disclosed in the appended claims.

What is claimed is:

1. A receiving method used in a radio system comprising at least one base station (1, 2) and subscriber terminal equipment (3–5) which base station (1, 2) and subscriber terminal equipment (3–5) multiply a signal by a spreading code and look for one or more propagation delays of the received signal when the signal has propagated on one or more paths, characterized by convolution transforming the received signal;

convolution transforming the spreading code of the receiver;

multiplying the transformed signal (36) and spreading code (37) to provide a product (38);

shifting the phase of the product (38) by an amount dependent on the propagation delay;

and inverse convolution transforming the phase-shifted product (39) and combining the components of the transmitted signal that have propagated on different paths, whereby the information of the signal can be detected.

2. A method according to claim 1, characterized in that the convolution transform is carried out as a Fourier transform and the inverse convolution transform is carried out as an inverse Fourier transform.

3. A method according to claim 1, characterized by the inverse convolution transform is carried out by integrating, by which the signals propagated on many paths are combined.

4. A method according to claim 2, characterized by when the inverse convolution transform is carried out by a Fourier transform, the phase of the product is shifted by the propagation delay, in which case the frequency of the signal moves to zero.

5. A method according to claim 1, characterized in that the phase of the product (38) is shifted by multiplying the product by the convolution transform (41) of the impulse response delayed by the propagation delay.

6. A receiver used in a radio system comprising at least one base station (1, 2) and subscriber terminal equipment (3–5) which base station (1, 2) and subscriber terminal equipment (3–5) are arranged to multiply a signal by a spreading code and look for one or more propagation delays of the received signal when the signal has propagated on one or more paths, characterized by the receiver comprises transform means (30a, 30b) for convolution transforming the received signal and the spreading code;

multiplication means (31) for multiplying the transformed signal (36) and spreading code (37) to provide a product (38);

shift means (33) for shifting the phase of the product (38) by an amount dependent on the propagation delay;

and inverse transforming means (34) for inverse convolution transforming the phase-shifted product (39) and for combining the signal that was transmitted on different paths, whereby the information of the signal can be detected.

7. A receiver according to claim 6, characterized by the transform means (30a, 30b) are arranged to carry out the convolution transform as a Fourier transform and the inverse transform means (34) are arranged to carry out the inverse convolution transform as an inverse Fourier transform.

8. A receiver according to claim 6, characterized by the inverse transform means (34) are arranged to carry out the inverse convolution transform by integrating, by which the signals propagated on many paths are combined.

9. A receiver according to claim 6, characterized by when using Fourier transform means as transform means (30a, 30b), the shift means (33) are arranged to shift the phase of the product (38) by the propagation delay, whereby the frequency of the product is zero.

10. A receiver according to claim 6, characterized in that the shift means (33) is arranged to shift the phase of the product (38) by multiplying the product (38) by the convolution transform (41) of the impulse response delayed by the propagation delay.

* * * * *